M. HOLDEN.
Millstone Dress.

No. 8,272.

Patented Aug. 5, 1851.

UNITED STATES PATENT OFFICE.

MOORE HOLDEN, OF LAWRENCEBURG, INDIANA.

DRESSING MILLSTONES.

Specification of Letters Patent No. 8,272, dated August 5, 1851.

*To all whom it may concern:*

Figure 1:
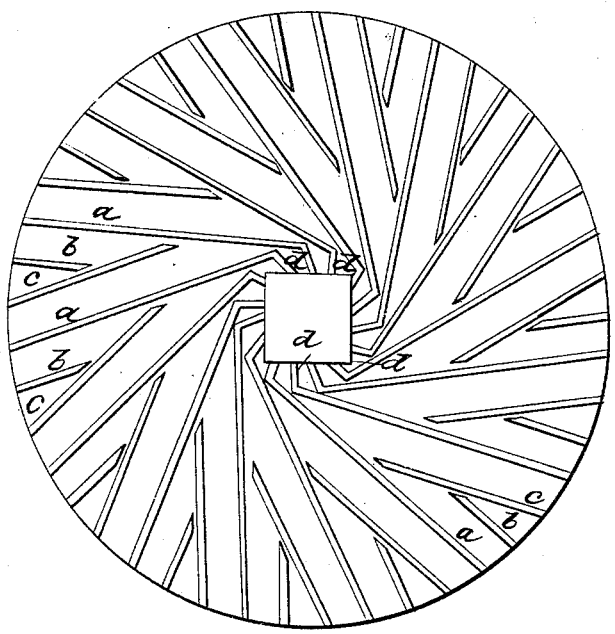
Figure 2:
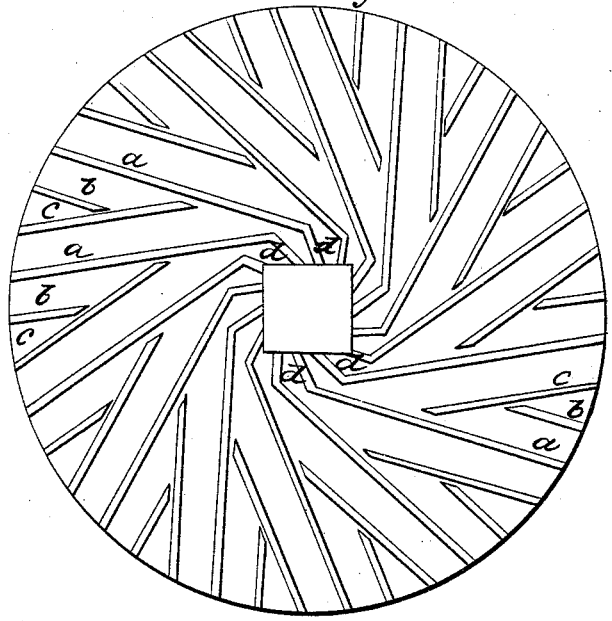

Be it known that I, MOORE HOLDEN, of Lawrenceburg, Indiana, have invented new and useful Improvements in Dressing Millstones; and I do hereby declare that the following as a full, clear, and exact description of the same, reference being had to the annexed drawing, in which, made part of this specification, Figure 1 represents the face of the dressed runner and Fig. 2 the face of the dressed bed stone.

It is well known to millers that the cooler grain can be ground the better it is for the quality of the flour. When flour is heated in grinding, chemical changes take place and the flour in the language of the miller is killed. No gluten is acted upon when grain or chopstuff is retained too long near the eye of the stone. The material becomes hot, tough, and sticky; great friction is caused thereby and the stone labors excessively. Greater power being applied, greater heat results and the product of the grinding falls off in quality and quantity. The method has been to crowd the center and depend upon the increased area and speed of the outskirt of the stone, to spread and relatively thin and thereby keep the flour cool, the operation being also under the influence of centrifugal action. It has long been ascertained that something more than the foregoing was needed to accomplish the purpose. Many ways of dressing the stones have been devised to fill this void, but I am not aware that any great success has hitherto been attained. If the dress of the stone does not admit of crowding the center so as to grind fast at this point without the chopstuff being retained so long as to cause it to be heated tough and sticky the whole process is spoiled. The object is to grind fast at the center, pass the chopstuff cool to the outskirt and there retain it where the increased area and speed of the stone affords every facility for completing the process of grinding.

Great experience in milling has led me to adopt the mode of dressing stones as herein laid down. Great results have been the consequence and condemned water wheels and run of stones have been restored to favor, which otherwise would have been thrown out as useless. There is no part of the milling process which plays a more important part than that dependent on the dress of the stones. The yield resulting from my mode of dress has been equal to an increase of many barrels of flour per day according to the number of stones running. In a mill with two run of stone driven by Tasker wheels the product of which had been 90 barrels per day I succeeded in obtaining from one run of stone with my dress at the rate of 82 barrels per day.

My plan is to lay off the runner into 15 quarters with a draft of 8 inches, and the bed stone into 14 quarters with a draft of 9 inches, say in a 4½ foot bur. The leading furrow is made tangential to this draft and has a length of about 26 inches. The issues from the eye of the stone to the leading furrows may be in any way judiciously arranged so as to open into the leaders. The quarter has three furrows including the leader, and the last furrow of each preceding quarter is parallel to the leader of each succeeding quarter as is also the furrow next the leader of one in each quarter. The last mentioned furrow would open into the first mentioned furrow and this into the leader, if the furrows were projected therefor, but they cease before arriving at that point. The statements in the foregoing sentence refer to the furrows of any one quarter. The furrows are equally distant from each other at the verge of the stone and every three consecutive furrows are parallel to each other, each three belonging to adjacent quarters. By laying off the diagram resulting from the foregoing data, a definite and fixed location is given to the furrows. This diagram will give the furrow ($a$) which is about 26 inches long in a 4½ foot bur and is termed the leading furrow, ($d$) being a series of feeders one of which opens into each leading furrow. ($b$) is the retarding furrow, so called because its position admirably effects that purpose for each quarter and ($c$) is the delivery furrow, so called because it is the relieving furrow of each quarter, leaving the leader of the next quarter to perform its legitimate duty.

By making a difference of an inch in the draft of each pair of stones (the runner and bed stones) I obtain a shears motion of the furrows, a feature which is found very effective.

My land stick is 1⅞ inches for bedstone and 1⅝ inches for the runner. My furrow stick is 1⅛ inches for either.

Having thus fully, clearly, and exactly described the nature, construction, and operation of my invention, being an improvement in dressing millstones, what I claim therein as new and desire to secure by Letters Patent is—

1. The dress given to millstones according to the definite and fixed rule described in the foregoing specification and illustrated in the drawing by the furrows (*a*), (*b*), (*c*) of each quarter.

2. I also claim diminishing the draft of the runner and increasing the number of the quarters in comparison with that given the bedstone for the purpose of giving the furrows of each stone as determined by the rule laid down in the specifications, a shears motion upon each other.

MOORE HOLDEN.

Attest:
THOS. G. CLINTON,
B. OERTLY.